INVENTOR
M. T. WEISS
BY Roy M. Porter, Jr.
ATTORNEY

April 4, 1961

M. T. WEISS 2,978,649

SOLID STATE MICROWAVE DEVICE

Filed May 20, 1957

3 Sheets-Sheet 2

INVENTOR
M. T. WEISS
BY Roy M. Porter Jr.
ATTORNEY

April 4, 1961

M. T. WEISS 2,978,649

SOLID STATE MICROWAVE DEVICE

Filed May 20, 1957

3 Sheets-Sheet 3

INVENTOR
M. T. WEISS
BY Roy M. Porter Jr.
ATTORNEY

United States Patent Office 2,978,649

Patented Apr. 4, 1961

2,978,649

SOLID STATE MICROWAVE DEVICE

Max T. Weiss, Elizabeth, N.J., assignor to Bell Telephone Laboratories, Incorporated, New York, N.Y., a corporation of New York Filed May 20, 1957, Ser. No. 660,280

16 Claims. (Cl. 330—56)

This invention relates to the generation and amplification of extremely high frequency or microwave signals and more particularly to low noise gyromagnetic oscillators and amplifiers.

In a copending application of H. Suhl, Serial No. 460.464, filed February 15, 1957, and in his article "Proposal for a Ferromagnetic Amplifier in the Microwave Range" in the Physical Review, volume 106, page 384, April 15, 1957, there is described an amplifier whose mode of operation is based upon the known principle that if the amount of energy injected into an oscillatory system at a frequency referred to as the pumping frequency is kept below the critical self-oscillation threshold, it would be possible to produce amplification of signals at the frequency of said system.

Specifically, in said copending application and publication there is described a microwave device embodying this principle. There is provided a multimode resonator comprising a cavity or chamber that is proportioned to be resonant in two modes having frequencies $f_1$ and $f_2$, preferably, though not necessarily, different. A pumping frequency $f_p$ is also applied to the cavity. This pumping frequency is selected so that $f_p=f_1+f_2$. Coupling between the oscillation mode of the pumping frequency and the modes of the signal frequencies $f_1$ and $f_2$ is provided by a body of gyromagnetic material, such as a high resistivity manganese ferrite, disposed within the cavity and polarized by a steady direct-current magnetic field so oriented that three conditions are met:

(1) One of the two signal frequency fields ($f_1$ or $f_2$) has a magnetic field component that is perpendicular to the steady direct-current magnetic field.

(2) The other of the two signal frequency fields ($f_2$ or $f_1$) has a magnetic field component that is parallel to the steady magnetic field.

(3) The pumping frequency ($f_p$) has a magnetic field component that is perpendicular to the steady magnetic field.

Under the influence of the pumping frequency magnetic field component, applied as set forth in accordance with condition (3), the magnetization of the gyromagnetic material will precess to produce a component of magnetization oscillating perpendicular to the steady field. Upon this system is superimposed the magnetic field of the signal $f_1$ parallel to the steady field, in accordance with the requirements of condition (2). This modulates the steady field so that the resonant frequency of the magnetization is varied. In the presence of the gyromagnetic material, this mixes with the pumping frequency $f_p$ to produce a radio frequency component of magnetic field at a frequency $$f_p-f_1=f_2$$

perpendicular to the direct-current field direction, thus satisfying the requirements of condition (1). In like manner, the induced radio frequency field $f_2$ will produce a field at the frequency $$f_p-f_2=f_1$$

parallel to the steady field.

Thus a feedback system is realized that results in the production of a negative resistance. As discussed in detail in these references, when the magnitude of the pumping energy $f_p$ exceeds a definable threshold value, the system is unstable and goes into sustained self-oscillations. However, by limiting the pumping energy below this level the system is stable. Signal energy to be amplified at either the frequency $f_1$ or $f_2$ may be introduced into the cavity. It may be withdrawn at the same frequency in amplified form.

The multimode cavity employed by Suhl, while representing a fundamentally sound embodiment of the ferromagnetic type amplifier, does present several practical problems. Multimode cavities are of necessity larger and more difficult to excite than dominant mode cavities. This is particularly so where ferrites are to be utilized in conjunction with such higher order mode configurations. It is well known that ferrite bodies will distort the field configurations within the cavity in an unpredictable manner, making the design of ferrite amplifiers extremely difficult and uncertain. In addition, multimode cavities require more ferrite material to provide the required coupling and hence more extensive and more power consuming magnetic field configurations. Similarly, there is the possibility of generating spurious modes in which the orientation of the magnetic fields will be improper.

It is, therefore, on object of the present invention to improve and stabilize low noise ferromagnetic oscillators and amplifiers.

It is a further and more specific object of the present invention to excite a plurality of independent electromagnetic wave fields having a single localized and concentrated common field region in which the relative polarizations and other parameters are proper to provide amplification or oscillation of the type described.

In accordance with the present invention a composite conductively bounded enclosure for electromagnetic waves is provided having substantially electrically separate but physically intersecting resonators, each capable of supporting an independent wave field within distinct frequency bands. The intersection of the resonators provides a region occupied in common by the distinct fields in which an element of gyromagnetic material is located to provide the only significant transfer of energy among the fields. All other potential coupling between the fields is inhibited by particularly selecting non-coupling modes to support the energy in each resonator. In particular, a dominant mode rectangular wage guide is employed for one resonator and a strip-line for another resonator. The modes on these two different wave supporting media have components that bear the proper relationship to each other and to an applied steady biasing field within the gyromagnetic material as required for amplification. Furthermore, these modes have insufficient coincidence of either electric or magnetic field to produce undesired spurious coupling.

In a first embodiment of the invention, the two component signals $f_1$ and $f_2$ contemplated by Suhl are identical. Thus, an input signal of a given frequency is amplified as an output signal at the same frequency. Alternatively, the devices may produce self-oscillation at this frequency. In a second embodiment, the two component signals $f_1$ and $f_2$ are separated in frequency and isolated in the amplifier. Thus, an input signal at $f_1$ will produce an amplified output at both $f_1$ and $f_2$. Amplification either with or without frequency changing is, therefore, possible. In a condition of self-oscillation, this embodiment will produce outputs at both $f_1$ and $f_2$.

These and other objects, the nature of the present invention and its advantages and features, will appear more fully upon consideration of the various specific illustrative embodiments described in detail with respect to the accompanying drawings in which:

Fig. 1 is a perspective view of the first embodiment of the invention connected for use as an amplifier;

Fig. 2, given for the purposes of explanation, is a diagrammatical showing of the component magnetic field patterns in the embodiment of Fig. 1;

Figures 1, 2:
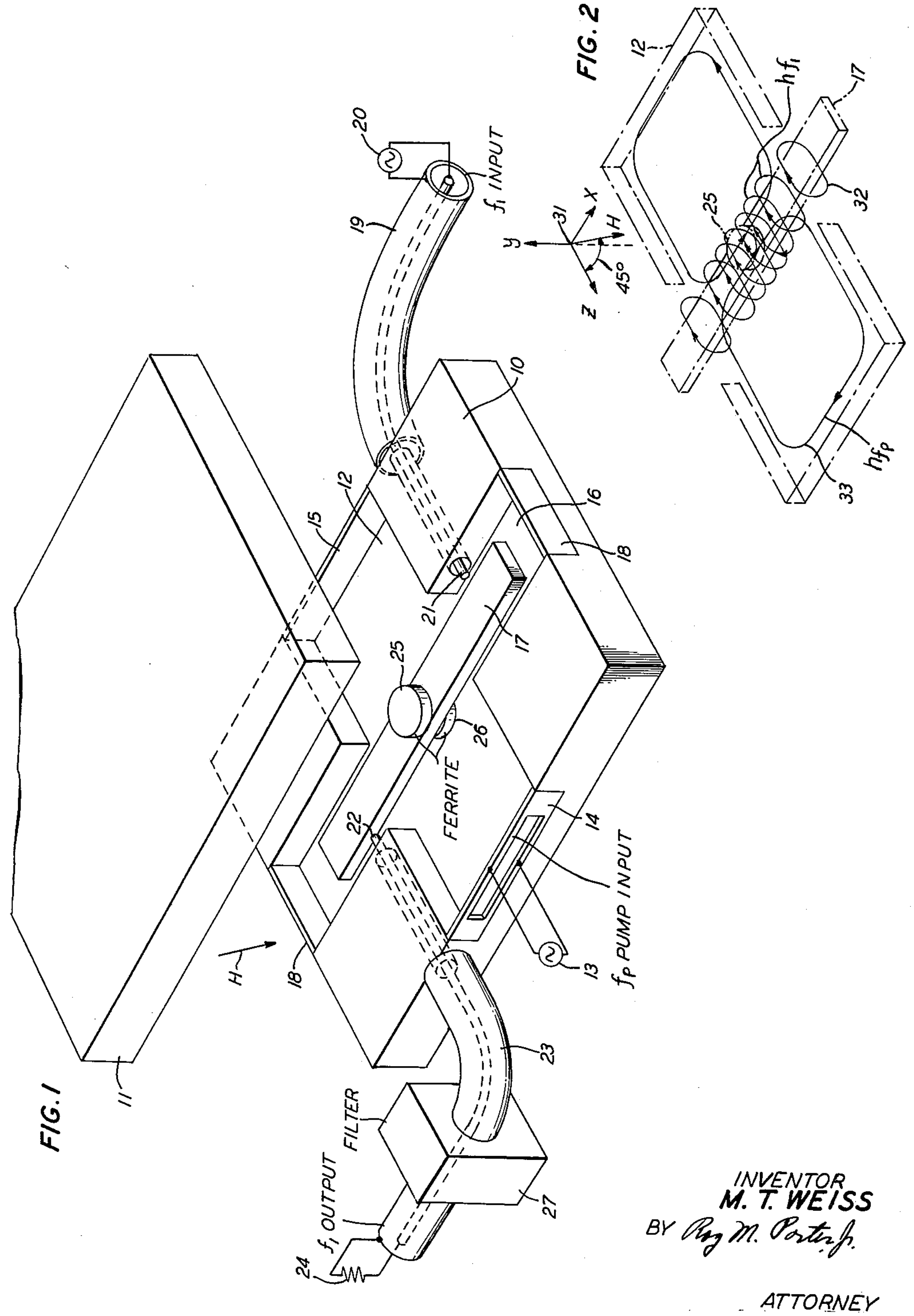

Referring more particularly to Fig. 1, a perspective view of an illustrative embodiment of the present invention is shown connected and utilized to produce amplification at microwave frequencies. Such an amplifier comprises two intersecting resonators which, for convenience, have been integrally constructed by milling or casting them in a block 10 having a suitable cover plate 11. The first of these resonators is of the wave guide type and comprises a rectangular channel 12 in block 10 having a wide dimension of greater than one-half wavelength and less than one wavelength at the pumping frequency $f_p$. The input end of channel 12 is connected to a source 13 of pumping frequency $f_p$ through an iris 14. The other end of channel 12 is terminated in a reflecting member 15. The distance between iris 14 and reflector 15 is a multiple of one-half wavelengths to produce resonance at the frequency $f_p$ as will be discussed hereinafter.

The second resonator is of the strip-line type and comprises a channel 16 extending at right angles to channel 12. The wide dimension of channel 16 is small enough so that it is beyond cut-off at the frequency $f_p$ and, therefore, does not interfere with the resonant cavity formed by channel 12. Suitably supported within channel 16 and extending longitudinally therein in a plane parallel to the top and bottom walls of channel 16 is a thin conductive member 17. Together with the top and bottom walls of channel 16, serving as the conductive ground planes therefor, member 17 forms a strip-line wave supporting structure 16—17. Member 17 may have cross-sectional dimensions that are somewhat smaller than the corresponding dimensions of channel 16. Member 17 is centered between the wide walls of channel 16 and extends an equal distance on either side of channel 12. Both ends of channel 16 may be terminated by conductive plates 18 for improved shielding.

A wave at the frequency $f_1$ to be amplified is launched upon the resulting strip-line 16—17. As illustrated, the wave is applied from source 20 by way of coaxial conductor 19 and capacitive probe 21 extending through block 10 to a point adjacent to member 17 of line 16—17 in accordance with usual practice. The amplified output signal may then be taken from the other end of line 16—17 by a similar capacitive probe 22 connected by coaxial conductor 23, through filter 27 to load 24. The need and parameters of filter 27 will be considered hereinafter. The electrical length of conductive member 17, which determines the electrical length of strip-line 16—17, is a multiple of half wavelengths to produce resonance at frequency $f_1$ as will be described hereinafter.

Nonlinear coupling between the energy supported in the resulting resonators 12 and 16—17 is provided by bodies 25 and 26 located above and below member 17. These bodies may advantageously take the form of discs or cubes and may additionally provide the support and spacing of member 17. Discs 25 and 26 may be made of any suitable low-loss gyromagnetic material. Preferably, however, they should be single crystal materials which have a narrow resonance line in order to conserve pumping power. For this use single crystals of manganese ferrite or yttrium-iron garnet have been found satisfactory. A particular advantage of the present invention resides in the small amount of material required which is a particularly important feature in view of the difficulty of obtaining large samples of single crystal material. Furthermore, the desirability of keeping the volume of the material small to reduce dielectric losses is also favored by the invention.

Suitable means not illustrated in detail are provided for supplying a steady external magnetic field to discs 25 and 26 as represented on Fig. 1 by the vector H directed in substantially the plane of channels 12 and 16 and at substantially 45 degrees to the longitudinal axes of both channels 12 and 16. The significance of this field direction as well as the significance of other factors mentioned hereinbefore may be more easily understood in connection with an examination of the magnetic field patterns of wave energy supported upon strip-line 16—17 and within resonator 12.

Referring, therefore, to Fig. 2, the outlines of the boundaries of cavity 12 and of the conductor 17 of strip-line 16—17 are shown in a coordinate system represented by the mutually perpendicular vectors 31, the $x$ vector indicating a sense along the transverse wide dimension of cavity 12, the $y$ vector along the transverse narrow dimension of cavity 12, and the $z$ vector along the longitudinal direction of cavity 12 and perpendicular to the axis of conductor 17.

The magnetic field loops of the signal frequency $f_1$ are illustrated by the closed loops 32 encircling conductor 17 and lying in planes perpendicular to its axis that vary in intensity sinusoidally along the length of the conductor. In accordance with the invention, conductor 17 is a multiple of half wavelengths long so that it is resonant at the frequency $f_1$ and, more specifically, extends an odd number of quarter wavelengths on either side of the region including discs 25 and 26 so that the magnetic field at the ends of conductor 17 are zero with a maximum in the vicinity of discs 25 and 26. Thus, in the region of discs 25 and 26 the signal frequency $f_1$ produces a maximum field in the $z$ direction.

The magnetic field loops of the pumping frequency $f_p$ are illustrated by the closed loops 33 comprising the standing wave pattern set up in cavity 12. These loops lie in planes which are parallel to the wide dimension of cavity 12. In accordance with the invention, cavity 12 is a multiple of half wavelengths long and, more specifically, extends a whole number of half wavelengths on either side of the region including discs 25 and 26 so that the magnetic field in this region is maximum and exists substantially in the $x$ direction.

It may now be noted that there is no direct field coupling between the field of $f_1$ represented by loops 32 and the field of $f_p$ represented by loops 33. The $x$ component of $f_p$ is always normal to the $y$ and $z$ component of $f_1$ while the $z$ component of $f_p$ couples in canceling amounts on opposite sides of the conductor 17 with the $z$ component of $f_1$. Similarly, the electric field of $f_1$ is oppositely directed above and below conductor 17, and cannot couple to the unidirectional field of $f_p$ in channel 12. Furthermore, the wide dimension of channel 12 renders it beyond cut-off at the frequency $f_1$ and the wide dimension of channel 16 renders it beyond cut-off at the frequency $f_p$.

The exclusive coupling between the fields is provided by the gyromagnetic material of discs 25 and 26. This coupling is such that the criteria set forth by Suhl are met. Since there is only one signal frequency field, there is a merger of requirements (1) and (2) set forth hereinbefore such that the field $f_1$ must have components both perpendicular and parallel to the steady field. Since the steady field H is applied at approximately a 45-degree angle, it is perpendicular to a component of the $f_1$ field, parallel to another component of the $f_1$ field, and perpendicular to a component of the $f_p$ field in the region of the gyromagnetic material.

In operation as a microwave amplifier, the frequency $f_p$ is adjusted to be twice the frequency $f_1$ and to have a magnitude below the threshold level of self-oscillation as defined by Suhl. The strength of the external magnetic field is adjusted to produce gyromagnetic resonance in discs 25 and 26 at the frequency $f_p$.

The component of the pumping field $f_p$ perpendicular to the steady field causes the magnetization within discs 25 and 26 to precess. The component of the signal field parallel to the steady field modulates the resonant frequency. A modulation product $f_p-f_1$ is produced perpendicular to the steady field. Since $f_p$ is twice $f_1$, the modulation product has the same frequency as $f_1$ and couples back with that component of the initial field $f_1$ that is perpendicular to the steady field. Feedback is established and amplification is produced. The amplified signal is removed by cable 23, and delivered through filter 27 to load 24.

The above-described operation assumes that $f_1$ is a substantially single frequency band equal to exactly one-half of $f_p$. If the band is wider, for example, a band extending from $f_1$ to $f_1+\Delta f$, then the modulation products are more complicated. As a result of the mixing of the signal frequency $f_1+\Delta f$ with $f_p$, there is produced modulation components at a frequency $$f_p-(f_1+\Delta f)=2f_1-(f_1+\Delta f)=f_1-\Delta f$$

as well as the desired products $$f_1+\Delta f$$

In certain applications both sideband products may form the useful output of the amplifier, as for example, in the regeneration of broad band pulses or in the amplification of uncorrelated noise signals. However, if a single sideband only is required, the undesired one of these sidebands must then be removed by filter 27 which should have the required high-pass or low-pass characteristic with a cut-off frequency at $f_1$.

If the magnitude of pumping frequency $f_p$ is increased above the threshold level, self-sustained oscillations at the frequency $f_1$ will be produced which may be extracted from the device through either coaxial cable 19 or 23.

Figure 3:
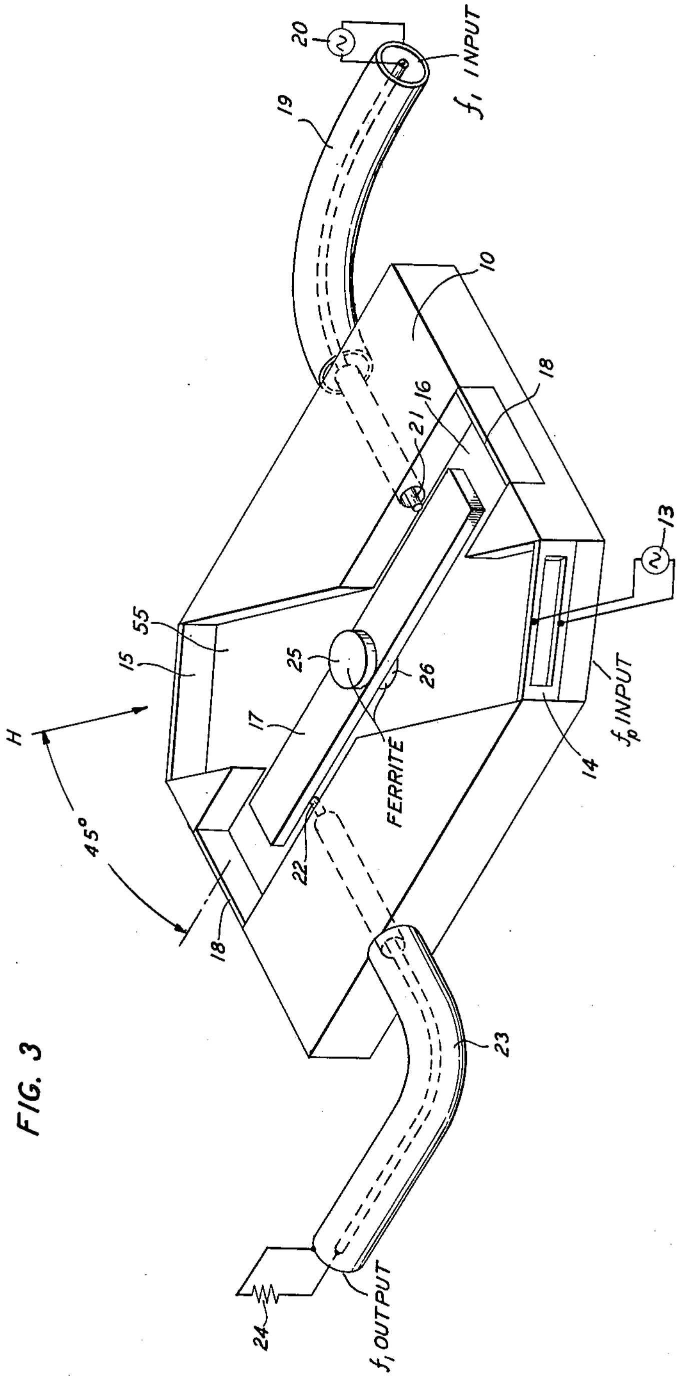
Fig. 3 is a perspective view of a modification of the embodiment of Fig. 1.

Improved operation of the embodiment in Fig. 1 is obtained by increasing the component of the pumping field $f_p$ that is perpendicular to the steady magnetic field. A novel way in which this may be accomplished is illustrated by the modification of the embodiment of Fig. 1 shown in Fig. 3. Modification will be seen to reside in the fact that the wave guide channel, designated 35 on Fig. 3, for the frequency $f_p$ is oriented at 45 degrees to the axis of conductor 17 and parallel to the steady field H. Thus, the steady magnetic field is perpendicular to the entire transverse field of $f_p$ in the region of the discs 25 and 26, rather than to a component only as in Fig. 1. All other relationships and parameters are unchanged and corresponding reference numerals have been employed to designate corresponding components.

Figure 4:
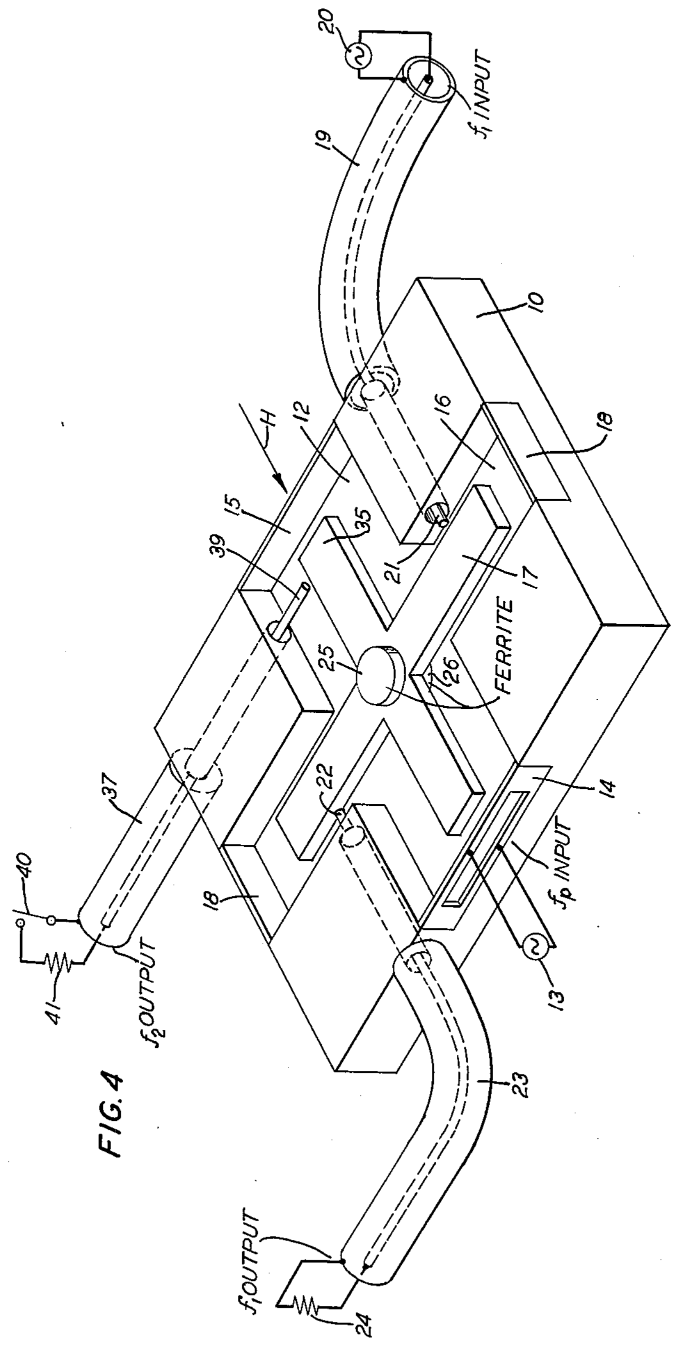
Fig. 4 is a perspective view of a second embodiment of the invention illustrating also how a number of sources and loads may be connected.

As noted above, when the embodiment of Fig. 1 is used as an amplifier of a finite band, the amplified output contains both an upper sideband and a lower sideband that must be separated by external filtering means. Furthermore, these two sidebands are immediately adjacent in the frequency spectrum which places high requirements on the filter. Referring now to Fig. 4, an embodiment of the invention is shown in which the initial and induced component fields are at different and separated frequencies $f_1$ and $f_2$. The upper sideband becomes $f_2+\Delta f$ and the lower sideband $f_1-\Delta f$. The two bands may be widely spaced in the frequency spectrum and are separately maintained in the amplifier structure. This eliminates the requirement of filters and also provides the possibility of frequency changing in addition to amplification, if desired.

Referring, therefore, to Fig. 4, a modification of the embodiment of Fig. 1 is shown in which corresponding components have been given corresponding reference numerals. Modification will be seen to reside in the addition of a second strip-line center conductor 35 capable of supporting independently the frequency $f_2$. More specifically, conductor 35 extends longitudinally in the center of channel 12 and forms a flattened cross with conductor 17. The presence of conductor 35 in no way interferes with the dominant mode support of the frequency $f_p$ in channel 12 but together with the top and bottom walls of channel 12 forms a strip-line wave supporting structure 35—12 capable of supporting an independent mode of propagation. The length of conductor 35 is a multiple of half wavelengths of the frequency $f_2$ so that it is resonant at this frequency. Conductor 35 extends an odd number of quarter wavelengths on either side of conductor 17 so that a maximum of transverse magnetic field of the energy supported thereon occurs at the intersection of conductors 17 and 35 and, therefore, in the vicinity of discs 25 and 26. No direct field coupling exists between any of the components of the three frequencies, $f_1$, $f_2$ or $f_p$ for the same reasons as detailed in connection with Fig. 1. The exclusive coupling is provided by the gyromagnetic action of discs 25 and 26.

In one mode of operation of the embodiment of Fig. 4, a band of frequencies centered about $f_1$ to be amplified may be applied from source 20 to strip-line 16—17. Pumping power is, therefore, applied from source 13 at a frequency $f_p=f_1+f_2$ and with a magnitude less than the threshold level. The strength of the steady field H is such as to produce gyromagnetic resonance at the frequency $f_p$ and is directed parallel to and in the plane of conductor 35. Therefore, the transverse component of the field $f_1$ as supported on line 16—17 is parallel to the steady field H and modulates the resonant frequency of the precession resulting from the component of the pumping field $f_p$ perpendicular to the steady field. Modulation products associated with the frequency $f_2$ are produced that have components perpendicular to the axis of strip-line 35—12 and can, therefore, excite an oscillatory mode thereon since its length is resonant at $f_2$. In turn the components $f_2$ are recoupled through the gyromagnetic material to line 16—17 resulting in amplification of the band associated with the frequency $f_1$. Amplified components may be delivered by coaxial cable 23 to load 24. The undesired side band components $f_2+\Delta f$ exist only upon strip-line 35—12 and do not reach the output.

If desired, however, the components associated with $f_2$ may be put to useful purpose by employing a further coaxial conductor 37 to couple through capacitive probe 39 to strip-line 35—12. By closing switch 40 these components are delivered to load 41 and represent the amplified input signal shifted in frequency from $f_1$ to $f_2$. Amplified output at the frequency $f_1$ is still available from coaxial cable 23. If, however, the use of components at frequency $f_1$ is unnecessary or undesired, coaxial cable 23 may be allowed to idle in an unloaded condition or it may be removed.

If the magnitude of the pumping power $f_p$ is increased above the threshold level, self-oscillation will commence, and components at the frequency $f_2$ will be available from coaxial cable 37 and at the frequency $f_1$ from coaxial cables 19 and 23.

In the above-described arrangements it has been specified that channel 12 be resonant at the frequency of the pumping power $f_p$. This is desirable in order to obtain the greatest concentration of the transverse field components of the pumping power in the vicinity of the gyromagnetic elements. However, a propagating wave of sufficient amplitude will provide the necessary components in the absence of a resonant condition. It is, therefore, possible to cascade a large plurality of amplifiers of the type described so that the pumping power may be fed successively from one amplifier to the next. Irises could also be inserted between amplifiers to introduce a standing wave pattern.

In all cases, it is understood that the above-described arrangements are merely illustrative of the principles of the invention. Numerous and varied other embodiments may be devised in accordance with these principles by those skilled in the art without departing from the spirit and scope of the invention.

What is claimed is:

1. First and second strip-line resonant cavities comprising two intersecting conductively bounded channels having top and bottom walls, a thin pair of orthogonally intersecting conductive members supported within said channels and extending longitudinally therein in a plane parallel to the top and bottom walls thereof, a pair of polarized elements of gyromagnetic material supporting said members, means for applying wave energy of a first frequency to one of said cavities and means for applying an electromagnetic field varying at a frequency different from said first frequency to said polarized element.

2. First and second resonant cavities comprising two intersecting conductively bounded channels having top and bottom walls, at least one thin conductive strip supported within one of said channels and extending longitudinally therein with the broad faces thereof parallel to said top and bottom walls, a polarized member of gyromagnetic material disposed adjacent to at least one face of said strip, and means for coupling electromagnetic wave energy into both of said cavities.

3. Apparatus as defined in claim 2 wherein said gyromagnetic member is composed of single crystal ferrite.

4. Apparatus as defined in claim 2 wherein said gyromagnetic member is composed of single crystal yttrium-iron garnet.

5. A component enclosure for electromagnetic waves comprising two intersecting conductively bounded channels, a thin conductive member supported in one of said channels and forming a strip-line wave supporting structure having a first resonant frequency determined by the length of said member, a pair of spaced discontinuities in the other of said channels forming a dominant mode supporting wave guide structure having a second resonant frequency determined by the distance between said discontinuities, a second thin conductive member supported in said other channel forming a second strip-line structure supporting a wave at a third resonant frequency determined by the length of said second member independent of said wave supported in the dominant mode in said channel and an element of magnetically polarized gyromagnetic material disposed within said enclosure in a region common to both of said channels.

6. A composite enclosure for electromagnetic waves comprising two intersecting conductively bound channels, the first of said channels containing a thin conductive member supported therein to form a first strip-line resonant chamber of frequency $f_1$, the second of said channels containing a second thin conductive member supported therein to form a second strip-line resonant chamber of frequency $f_2$, said second channel further proportioned to form a dominant mode rectangular wave guide resonant cavity at frequency $f_1+f_2$, said second chamber and said wave guide cavity being physically coincident but electrically isolated and an element of magnetically polarized gyromagnetic material disposed within said enclosure in a region common to both of said channels.

7. Apparatus according to claim 6 wherein said first channel is beyond cut-off for the frequency $f_2$ and wherein said second channel is beyond cut-off for the frequency $f_1$.

8. A power transfer device comprising a plurality of electromagnetic wave energy supporting transmission paths including one path supportive of wave energy having longitudinally and transversely extending magnetic field components, a second path supportive of wave energy having transversely extending magnetic field components only, said one path and said second path sharing a common region with the longitudinal axis of said one path intersecting the longitudinal axis of said second path within said region, said structures when so disposed having insufficient coincidence of field components to couple wave energy therebetween, exclusive means for coupling wave energy therebetween comprising an element of gyromagnetic material disposed within said common region, and means for establishing a steady magnetic biasing field within said element.

9. A high frequency signal amplifier comprising a plurality of electromagnetic wave energy supporting transmission paths including one path supportive of wave energy having longitudinally and transversely extending magnetic field components, a second path supportive of wave energy having transversely extending magnetic field components only, said one path and said second path sharing a common region with the longitudinal axis of said one path intersecting the longitudinal axis of said second path within said region, exclusive means for coupling wave energy between said paths comprising an element of gyromagnetic material disposed within said common region, means for establishing a steady magnetic biasing field within said element, means for energizing said one path at a first frequency, means for energizing said second path at a second frequency lower than said first frequency, and means for withdrawing amplified wave energy at said lower frequency from said second path.

10. The combination according to claim 9 wherein said longitudinal axes intersect at right angles and wherein said biasing field is directed at an angle of 45 degrees with respect to said axes.

11. The combination according to claim 10 wherein said second frequency is substantially equal to one-half said first frequency.

12. The combination according to claim 9 wherein said first path comprises a dominant mode waveguide cavity tuned to said first frequency wherein said second path comprises a strip transmission line cavity tuned to said second frequency and wherein said common region includes portions of both of said cavities.

13. The combination according to claim 12 wherein said paths are caused to intersect at a point along their respective axes corresponding to a point of maximum magnetic field intensity.

14. A high frequency signal amplifier comprising a plurality of electromagnetic wave energy supporting transmission paths including a first transmission path supportive of wave energy having longitudinally and transversely extending magnetic field components, second and third transmission paths supportive of wave energy having transversely extending magnetic field components only, said paths sharing a common region with the longitudinal axis of said second path intersecting at an angle of 90 degrees the longitudinal axis of said first path at a given point within said region, and with the longitudinal axis of said third path intersecting at an angle of 90 degrees the longitudinal axis of said second path at said given point within said region, exclusive means for coupling wave energy between said first and said second and third paths comprising an element of gyromagnetic material disposed within said common region, means for establishing a steady magnetic biasing field within said element, means for energizing said one path at a first frequency, means for energizing said second path at a second frequency lower than said first frequency, and means for withdrawing amplified wave energy at said lower frequency from said second path.

15. The combination according to claim 14 wherein said second path comprises a strip transmission line cavity tuned to said second frequency, wherein said third path comprises a strip transmission line cavity tuned to a third frequency, and wherein the sum of said second frequency and said third frequency is equal to said first frequency.

16. The combination according to claim 15 including means for withdrawing amplified wave energy at said third frequency.

References Cited in the file of this patent

UNITED STATES PATENTS

| | | |
|---|---|---|
| 2,713,152 | Brown | July 12, 1955 |
| 2,762,871 | Dicke | Sept. 11, 1956 |
| 2,806,138 | Hopper | Sept. 10, 1957 |
| 2,806,951 | Willwacher et al. | Sept. 15, 1957 |
| 2,815,488 | Von Neumann | Dec. 3, 1957 |
| 2,820,206 | Arditi et al. | Jan. 14, 1958 |
| 2,825,765 | Marie | Mar. 4, 1958 |
| 2,867,782 | Arditi | July 6, 1959 |
| 2,922,125 | Suhl | Jan. 19, 1960 |

OTHER REFERENCES

"Frequency Doubling in Ferrites," by W. P. Ayres et al., Journal of Applied Physics, vol. 17, No. 2, February 1956, pages 188–189.

"Microwave Frequency Doubling From 9 to 18 KMC in Ferrites," by Melchor et al., P.I.R.E., May 1957, pp. 643–646.

Phillips Technical Review, vol. 11, No. 11, pages 313–340, May 1950, "Gyromagnetic Phenomena Occurring With Ferrites," by Beljers et al.

"Journal of Applied Physics," April 1957, page 511.

Manley et al.: "Proceedings of the IRE," July 1956, pages 904–913.

Gotto: "Proceedings of the IRE," August 1959, pages 1034–1316.